US012034247B2

(12) United States Patent
Lee

(10) Patent No.: US 12,034,247 B2
(45) Date of Patent: Jul. 9, 2024

(54) MAGNETIC CONNECTOR ASSEMBLY

(71) Applicant: Vincent Lee, Lakewood, CA (US)

(72) Inventor: Vincent Lee, Lakewood, CA (US)

( * ) Notice: Subject to any disclaimer, the term of this patent is extended or adjusted under 35 U.S.C. 154(b) by 0 days.

(21) Appl. No.: 18/109,809

(22) Filed: Feb. 14, 2023

(65) Prior Publication Data

US 2023/0198199 A1 Jun. 22, 2023

Related U.S. Application Data

(63) Continuation of application No. 17/344,894, filed on Jun. 10, 2021, now Pat. No. 11,631,949, which is a continuation of application No. 16/784,221, filed on Feb. 6, 2020, now Pat. No. 11,070,004.

(51) Int. Cl.
*H01R 13/60* (2006.01)
*H01R 13/62* (2006.01)
*H01R 13/64* (2006.01)

(52) U.S. Cl.
CPC ......... *H01R 13/6205* (2013.01); *H01R 13/64* (2013.01)

(58) Field of Classification Search
CPC ................ H01R 13/6205; H01R 11/30; H01R 2103/00; H01R 13/22
See application file for complete search history.

(56) References Cited

U.S. PATENT DOCUMENTS

| | | | | |
|---|---|---|---|---|
| 10,666,309 B2 * | 5/2020 | Carnevali | H01R 31/06 | |
| 11,070,004 B2 * | 7/2021 | Lee | H01R 13/64 | |
| 11,631,949 B2 * | 4/2023 | Lee | H01R 13/6205 | 439/38 |
| 2010/0080563 A1 * | 4/2010 | DiFonzo | H01R 24/00 | 398/115 |

* cited by examiner

*Primary Examiner* — Phuong Chi Thi Nguyen
(74) *Attorney, Agent, or Firm* — Andrew S. Dallmann

(57) ABSTRACT

A magnetic connector assembly has a female connector with spring-loaded conductive pins slightly protruding inside a recess or cavity in the female connector's body. A corresponding male connector has a protrusion on its body with conductive pins slightly indented into the protrusion's surface. The protrusion on the male connector is sized and shaped to fit into the cavity in the female connector such that the male connector's pins engage the pins of the female connector, allowing for electrical communication across the connector assembly. Magnets on the male and female connectors secure them in a correct orientation. A unique shape ensures proper alignment of the pins and prevents the connection of incompatible devices.

11 Claims, 10 Drawing Sheets

MAGNETIC CONNECTOR ASSEMBLY

RELATED APPLICATIONS

This application claims the benefit of priority to U.S. patent application Ser. No. 16/784,221 titled Magnetic Connector Assembly filed Feb. 6, 2020, and U.S. patent application Ser. No. 17/344,894 titled Magnetic Connector Assembly filed Jun. 10, 2021, the entirety of which is incorporated fully herein by this reference, which claim the benefit of priority to U.S. Provisional Patent Application Ser. No. 62/801,910 titled Magnetic Connector Assembly filed Feb. 6, 2019.

FIELD OF THE INVENTION

The present invention pertains generally to connectors for use in electronic devices and data communication. More particularly, the present invention pertains to self-aligning, magnetically biased connectors. The present invention is particularly, but not exclusively, useful as a self-aligning connector for connecting signal carriers.

BACKGROUND OF THE INVENTION

It is generally known to provide magnetic coupling elements in electrical and non-electrical connectors. Examples of connectors that include magnetic coupling elements are disclosed in U.S. Pat. Nos. 4,484,761; 4,776,406; 7,277,013 and 7,334,433. Examples of magnetic breakaway connection devices for power lines or cables are disclosed in U.S. Pat. Nos. 5,315,064 and 5,623,122.

Examples of other types of electrical connectors that include magnetic elements are described in U.S. Pat. Nos. 2,170,287; 3,363,214; 3,431,428; 3,521,216; 3,808,577; 4,844,582; 4,874,316; 5,401,175; 5,812,356; 5,816,825; 5,941,729; 5,954,520; 6,183,264; 6,250,931; 6,267,602; 6,478,614; 6,527,570; 6,561,815; 6,607,391; 6,623,276; 6,727,477; 6,988,897; 7,066,739; 7,264,479; 7,311,526; 7,351,066; 7,517,222; 9,147,965; 9,887,488 and in U.S. Patent Application Publication Nos. 2004/0209489; 2005/0208783 and 2005/0255718.

U.S. Pat. No. 7,264,479 describes a connector for connecting two coaxial cables, wherein the holding forces between two connector or adapter portions are formed by means of magnetic forces. The mutually facing end faces of the two adapter portions are each provided with disks or plates for grounding. For this reason, connectors of this type require a user to orient and align the two adapter portions axially with respect to one another before the magnetic forces act and peg-shaped contact elements can latch into the corresponding annular mating contact elements.

Multi-pin connectors are useful for connecting signal carriers, such as computer cables, to peripheral devices, such as printers or displays, or for connecting signal carriers or other cables to electronic equipment, such as medical equipment. Multi-pin connectors may incorporate elements for connecting a plurality of conductive paths. Known multi-pin connectors may include connectors known as “D-sub connectors.” A D-sub connector contains two or more parallel rows of pins or sockets usually surrounded by a D-shaped metal shield that provides mechanical support, ensures correct orientation, and may screen against electromagnetic interference.

U.S. Pat. Nos. 9,147,965 and 9,887,488 describe a connector with magnetic elements forcing proper alignment of contact pins. As stated in the patents, the connectors are useful with computers and servers in situations in which a connector with threaded fasteners is undesirable. However, this requires one end of the connector to be built in or installed into the computer, allowing the counterpart connector to be used with it In cases in which a cable-to-cable connection is desired, the disclosed arrangement of pins in parallel rows, much like the pin arrangements of D-sub connectors, would create a bulky connection between the cables; in some environments, the resulting area occupied by the connectors may be more than desired.

One problem with prior art connectors that utilize threaded fasteners, for example, or which are not readily connected or disconnected, is that in environments where many cables and connectors are utilized, cable management becomes challenging. The rigid coupling implements, i.e., threaded fasteners, of known connectors makes untangling and proper wire or cable routing time consuming. A related problem is that sudden forces on such prior art connectors may cause irreparable damage to the connector, cable or electronic device. For example, in a hospital environment where electronic devices providing vital patient support functions are connected with prior art “hardline” connectors, medical personnel or others tripping over a cable could result in medical equipment falling and being damaged from impact, abrupt separation from a patient, or other consequences that could be catastrophic to equipment, patients and medical personnel.

Another problem in the prior art is that connectors that utilize multiple pins are prone to damage from misalignment or attempting connection with respective portions in an improper orientation. Typical prior art multi-pin connectors utilize somewhat lengthy pins on the male connector portion, which may extend to a point that is generally flush with the connector shield. Because of their length, the pins are more prone to bending and deformation caused by damage when they are exposed, or by misalignment during the connection process. If connection is attempted before the connector portions are properly aligned, bending, deformation or other damage may result to one or more pin conductors, rendering the connector permanently damaged and useless. Misaligned connectors also pose the risk of creating a short circuit, malfunction, or otherwise damaging the connected apparatuses as connections are made across wires that were not intended to be connected to each other.

Yet another shortcoming in prior art connectors, such as those that are mechanically connected to a computer, peripheral or other device, for example, using threaded fasteners or other rigid connectors, is that they require dexterity and visibility for connection in hard to reach or confined places, such as in the case where a number of connectors are engaged in the back of a computer or server in a tightly confined space, such as a server rack.

In some cases, however, it may be desirable to have a connector or a data cable itself securely attached to a device, for example, in the case of a permanently installed device to which the data cable is connected in a hard-to-reach place, and yet retain the benefits of a magnetically coupled connector that is easily disconnected, for example, when someone trips over the cable. Moreover, it would be useful to provide a connector retaining the benefits of a magnetically coupled connector, yet minimizing or efficiently arranging the space occupied by a cable-to-cable connection. It would also be advantageous to provide a way to add the benefits of a magnetically coupled connector to existing standard connectors. Thus, there is a need in the art for a solution to these and the other problems set forth above.

SUMMARY OF THE INVENTION

A Magnetic Connector Assembly has a female connector with spring-loaded conductive pins slightly protruding inside a recess or cavity in the female connector's body. A corresponding male connector has a protrusion on its body with conductive pins slightly indented into the protrusion's surface. The protrusion on the male connector is sized and shaped to fit into the cavity in the female connector such that the male connector's pins engage the pins of the female connector, allowing for electrical communication across the connector assembly. Magnets on the male and female connectors secure them in a correct orientation and alignment.

In a preferred embodiment, the recess of the female connector and the protrusion on the male connector have a two-fold rotationally symmetrical but otherwise irregular shape. The unique shape, which avoids large differences between its longest width and longest length, aids in assuring proper alignment of the pins, while avoiding the extended length and resulting bulk of a connector using parallel rows of pins. In conjunction with the magnets—the male connector and female connector each having one magnet with a forward-facing north pole and a second magnet with a forward-facing south pole—proper orientation is also ensured. Moreover, the use of a unique shape facilitates the prevention of connecting incompatible devices, avoiding potential damage to the devices, since, due to the uncommon connector shape, in most installations the male connector will only fit its corresponding female connector and vice-versa.

An alternative embodiment of the present invention uses a reversible pin layout, and the symmetrical shape thus allows for connection in two orientations. In order to enable the use of the connector in both orientations, the reversible embodiment uses a single forward-facing magnetic polarity on both sides of the female connector, and the opposite forward-facing polarity on both sides of the male connector. For example, both sides of the female connector may have magnets oriented so that the north pole faces forward, while both sides of the male connector would have magnets oriented so that the south pole faces forward.

In some embodiments a male or female connector of a Magnetic Connector Assembly has a receiver for a data cable connector on its base. A ring clip, and in some cases, a slotted receptacle for the data cable connector, is provided to secure the data cable to the connector of the Magnetic Connector Assembly. In other embodiments, the data cable terminates directly in the male or female connector of the Magnetic Connector Assembly, its wires being directly soldered onto the pins or conductive supporting apparatus attached directly or indirectly to the pins; the opposite end of the data cable terminates in a standard or proprietary connector, or attaches directly to a device that communicates through the data cable and across the Magnetic Connector assembly to another device.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION

Figure 1:
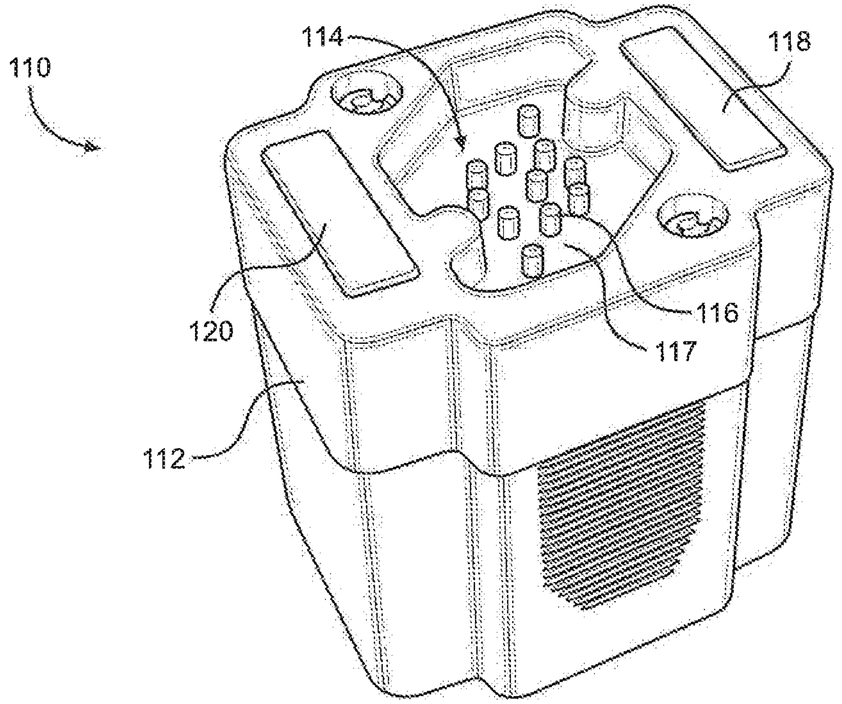
FIG. 1 is a perspective view of a female portion of a preferred embodiment of a Magnetic Connector Assembly.

Referring initially to FIG. 1, a female connector 110 of a preferred embodiment of a Magnetic Connector Assembly 100 has a body 112 with a cavity 114 defining an indentation into the body 112. In a preferred embodiment, cavity 114 has a rotationally symmetrical but otherwise irregular shape. In a preferred embodiment, the rotational symmetry is two-fold, meaning that the shape of cavity 114 is the same (in that it does not appear to have a distinct orientation) when rotated one-hundred eighty (180) degrees. A plurality of conductive contact pins 116 are on the bottom surface 117, outward-facing surface of cavity 114. In a preferred embodiment, contact pins 116 are spring-biased and protrude slightly beyond the bottom surface 117 of cavity 114, but remaining fully within the cavity 114 itself. Magnets 118 and 120 are situated outside of and on opposite ends of the cavity 114 of body 112.

Figure 2:
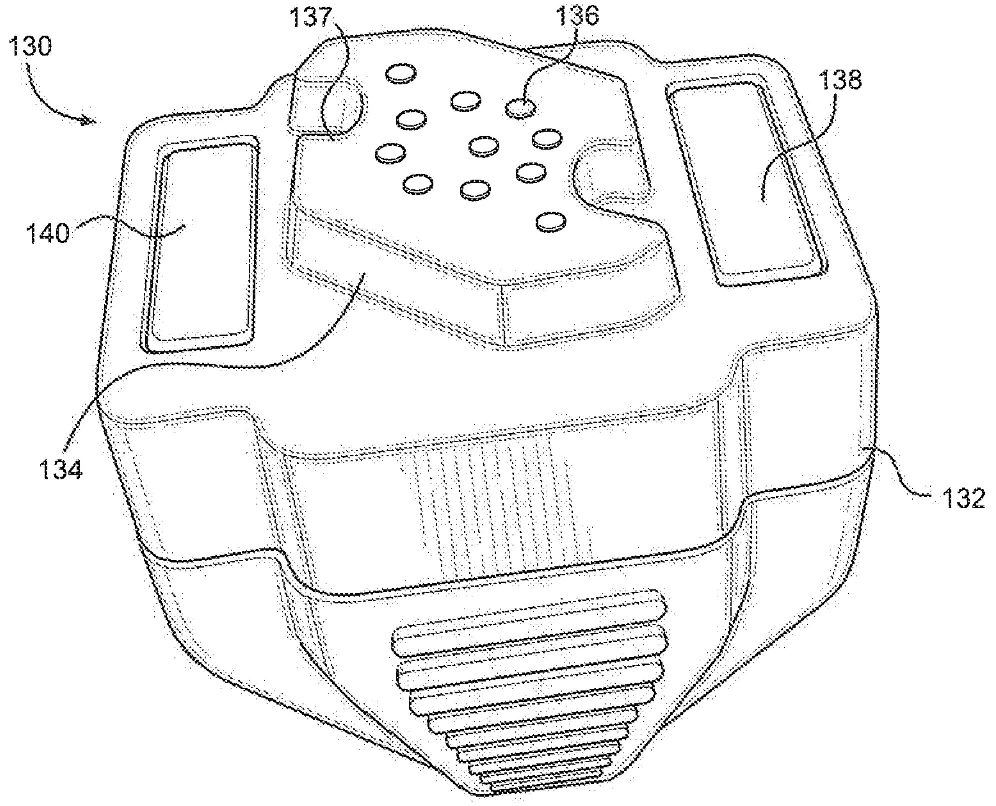
FIG. 2 is a perspective view of a male portion of the Magnetic Connector Assembly of FIG. 1.

Referring now to FIG. 2, a male connector 130 corresponding to female connector 110 is shown. The body 132 of male connector 130 has a protrusion 134 corresponding in shape to the cavity 114 of the female connector 110 and is sized to be received thereby. On the upper surface 137 of the protrusion 134 are conductive contact pins 136 arranged in a layout to correspond with pins 116 of the female connector 110. In a preferred embodiment, pins 136 are flush with or slightly indented into the upper surface 137 of the protrusion 134. With pins 116 inside cavity 114, and pins 136 flush with or indented into protrusion 134, the risk of bending or breaking the pins or making an erroneous electrical connection is greatly reduced relative to more traditional connectors.

In preferred embodiments, the irregular shape of cavity 114 and protrusion 134 is substantially similar along its length and width, meaning that smallest bounding rectangle of the shape has a length-to-width ratio between 0.5 and 1.5. In a preferred embodiment, the length-to-width ratio is approximately 0.75. However, other cavity 114 and protrusion 134 shapes, the length-to-width ratio of whose smallest bounding rectangles lie outside these ratios are fully contemplated herein.

Magnets 138 and 140 are situated outside of and on opposite ends of the protrusion 134 of body 132. In a preferred embodiment, magnet 120 has the opposite polarity of magnet 118, magnet 140 has the opposite polarity of magnet 120, and magnet 138 has the opposite polarity of magnet 118. For example, magnets 118 and 140 may have their north pole facing outward, while magnets 120 and 138 would have their south pole facing outward. As a result, the male connector 130 and female connector 110 are magnetically repulsed from each other when an attempt is made to connect them in the incorrect orientation, and are drawn together and secured by magnetic force when connected in the correct orientation. Thus, despite that the two-fold rotational symmetry appears to allow the male connector 130 to be received by the female connector 110 in two distinct orientations, the magnets allow the connectors to be joined in only one of those orientations.

When the female connector 110 and the male connector 130 are secured together, pins 136 push against pins 116, creating electrically conductive paths through the connectors. The spring supports of pins 116 allow them to be pushed slightly into the body 112 of the female connector 110, ensuring a proper fit between the male and female portions of the Magnetic Connector Assembly.

Moreover, the length of pins 116 and pins 136 are too short to allow for contact without the connectors 110 and 130 being properly oriented and aligned, thus avoiding shorts or unintended connections between unmatched pins. Thus, short-circuits and connections across pins not intended to be connected are avoided by the shape of cavity 114 and protrusion 134 in conjunction with the length of pins 116 and 136 and the operation of magnets 118, 120, 138, and 140.

Figure 3:
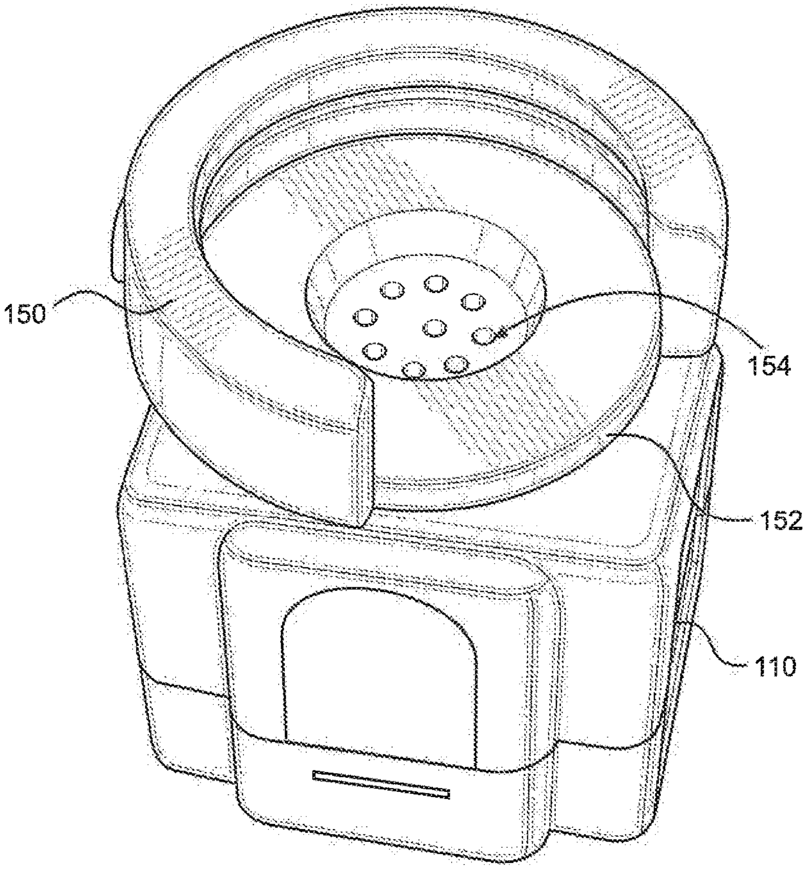
FIG. 3 is a perspective view of a portion of a preferred embodiment of a Magnetic Connector Assembly illustrating a data cable connector receiver and clip ring for securing the connector to a data cable connector.

Referring now to FIG. 3, a female portion 110 of a Magnetic Connector Assembly 100 is shown with a ring clip 150 for securing the end of the Magnetic Connector Assembly to an outside connector, such as a data cable connector. For illustration, the ring clip 150 is shown attached to a lip 152 on an end of a female connector 110, but a male connector 130 may also have a lip 152 configured for use with a ring clip 150. Lip 152 is opposite the side of the body having cavity 114 and pins 116, or protrusion 134 and pins 136 in the case of a male connector 130. Lip 152 is shown here around a receiver 154 for a standard circular data cable connector. Various embodiments of receiver 154 are arranged by shape and pin layout to receive the various data connectors currently available on the market, and receiver 154 may further be designed for custom and proprietary connectors as needed.

Figure 4:
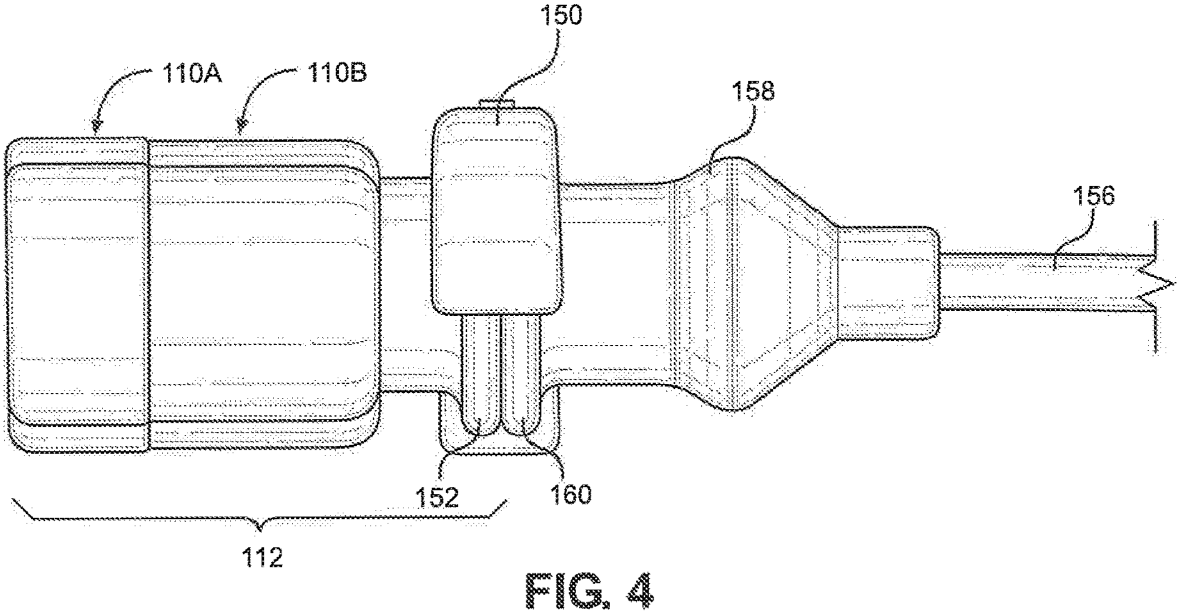
FIG. 4 is a side view of the portion of the Magnetic Connector Assembly of FIG. 3, illustrating a data cable attached to the Magnetic Connector Assembly and secured with the clip ring.

Referring now to FIG. 4, a data cable 156 having an end with a connector 158 with a lip 160 is shown attached to receiver 154 of the female connector 110 shown in FIG. 3. The connector 158 of the data cable 156 is attached to receiver 154 (not shown in this figure) such that lip 152 is placed against lip 160. Ring clip 150 is then placed around both lip 152 and lip 160, securing the female connector 110 and connector 158 of the data cable 156 to avoid accidental separation. In a preferred embodiment, ring clip 150 snaps into place around lip 152 and lip 160. As a result, connector 158, which may be a traditional form of connector, is provided the benefits of a magnetic connector in accordance with the present invention.

Figure 5:
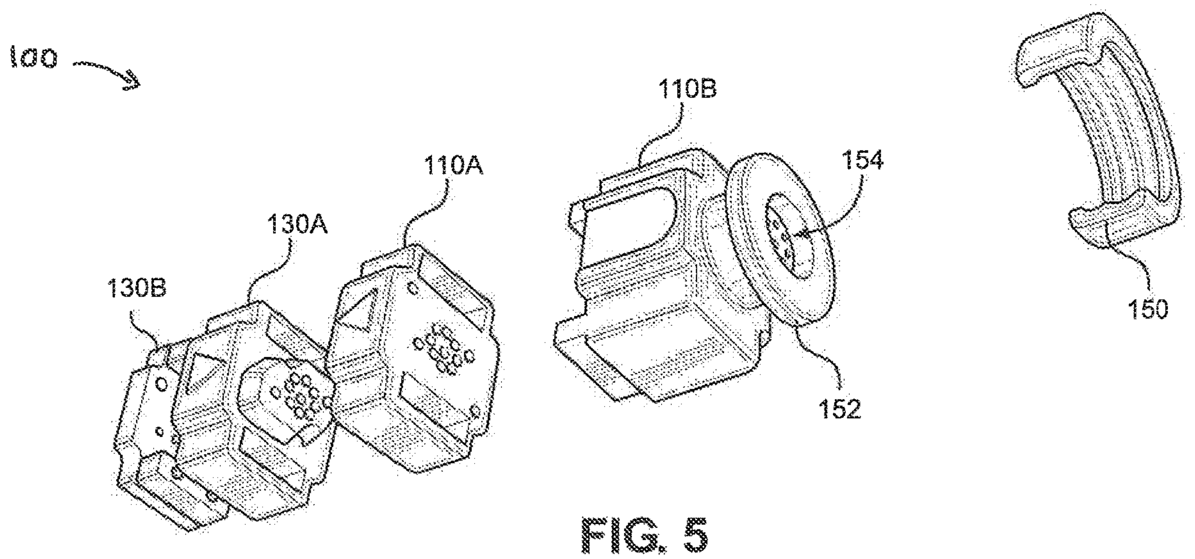
FIG. 5 is an exploded view of the Magnetic Connector Assembly of FIG. 3 showing the female portion, the male portion, and the clip ring sized to secure a data cable to the female portion.

As seen in FIG. 5, in a preferred embodiment, the female connector 110 is made up of a front piece 110A and a base piece 110B, that when joined together form the body 112. Similarly, in a preferred embodiment, the male connector 130 is made up of a front piece 130A and a base piece 130B joined to form the body 132. That is, front piece 110A is joined to base piece 110B to form the body 112 of the female connector 110; the conductive pins 116 are on the outer surface of the front piece 110A, while the receiver 154 is on the base 110B. Likewise, the conductive pins 136 are on the front piece 130A of male connector 130, while the base 130B also receives a data cable or other apparatus for providing communications through the Magnetic Connector Assembly.

Figure 6:
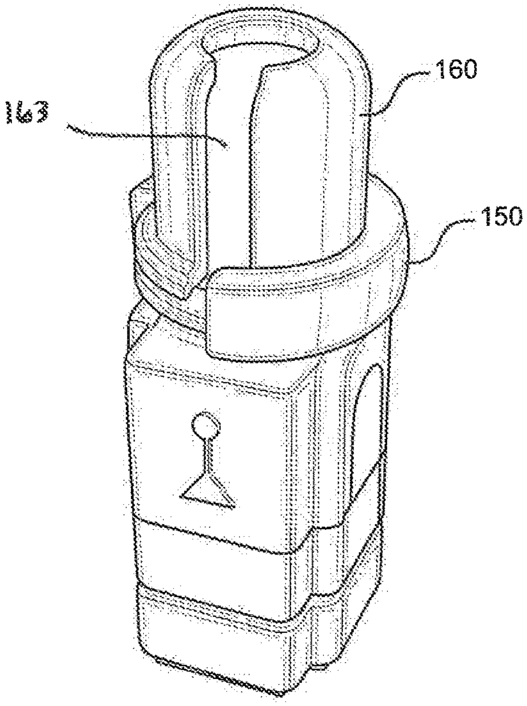
FIG. 6 is a perspective view of a Magnetic Connector Assembly with a threaded locking hood for securing the Magnetic Connector Assembly to a data cable connector.

Referring now to FIG. 6, a preferred embodiment of a Magnetic Connector Assembly includes a cable connector locking hood 160 on one or both of female connector 110 and male connector 130, which for illustrative purposes is shown on female connector 110 in FIG. 6. The locking hood 160 is useful for securing standard data cables that do not have a lip on their connectors to the Magnetic Connector Assembly. The locking hood 160 is formed with a threaded portion to be received within the female connector 110 and may be formed with a slotted receptacle 163 shaped to surround and hold in place a data cable connector, and may be used in conjunction with a ring clip 150.

Figure 7:
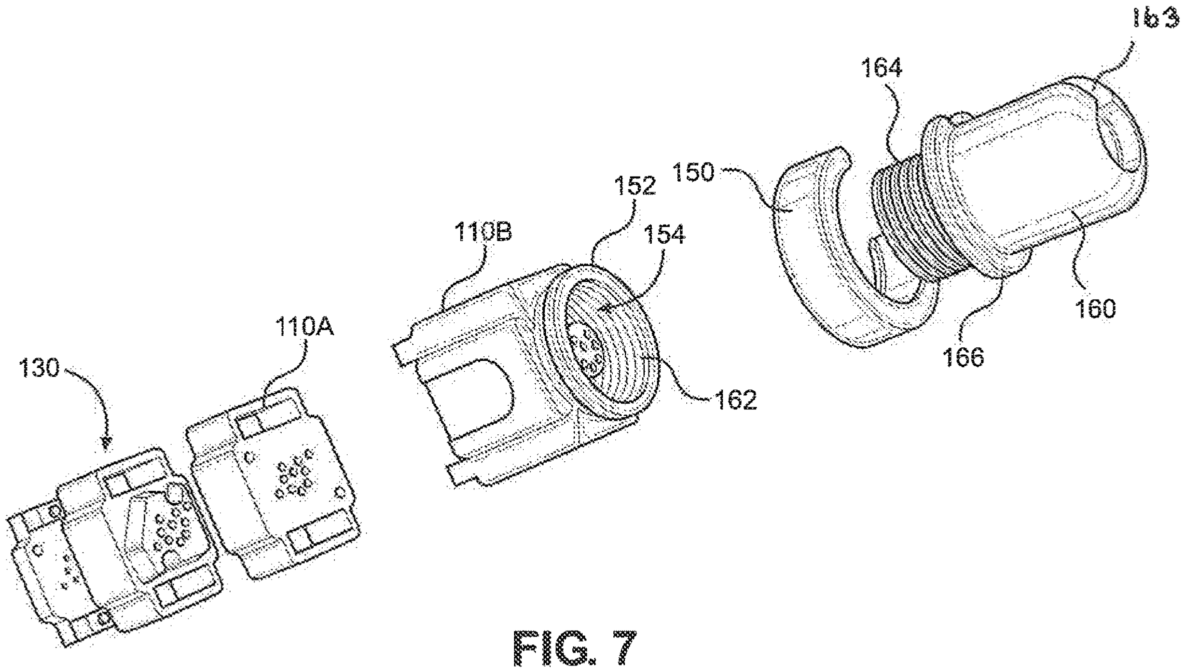
FIG. 7 is an exploded view of the Magnetic Connector Assembly of FIG. 6 showing the female portion formed with threads to receive the locking hood and secured in place with a locking ring.

As illustrated in FIG. 7, in embodiments using the screw locking hood 160, the receiver 154 has a threaded interior wall 162 corresponding to threads 164 on the screw locking hood 160. This allows the screw locking hood 160 to be securely fastened to the base 110B of the female connector 110, holding a data cable connector in place and properly connected to the Magnetic Connector Assembly. When secured to the base 110B, preferred embodiments of the screw lock 160 have a lip 166 which sits against lip 152 of the female connector 110, allowing a ring clip 150 to be placed around both lips, further securing the screw lock 160 to the female connector 110. In a preferred embodiment, ring clip 150 snaps into place around lip 152 and lip 166.

Figure 8:
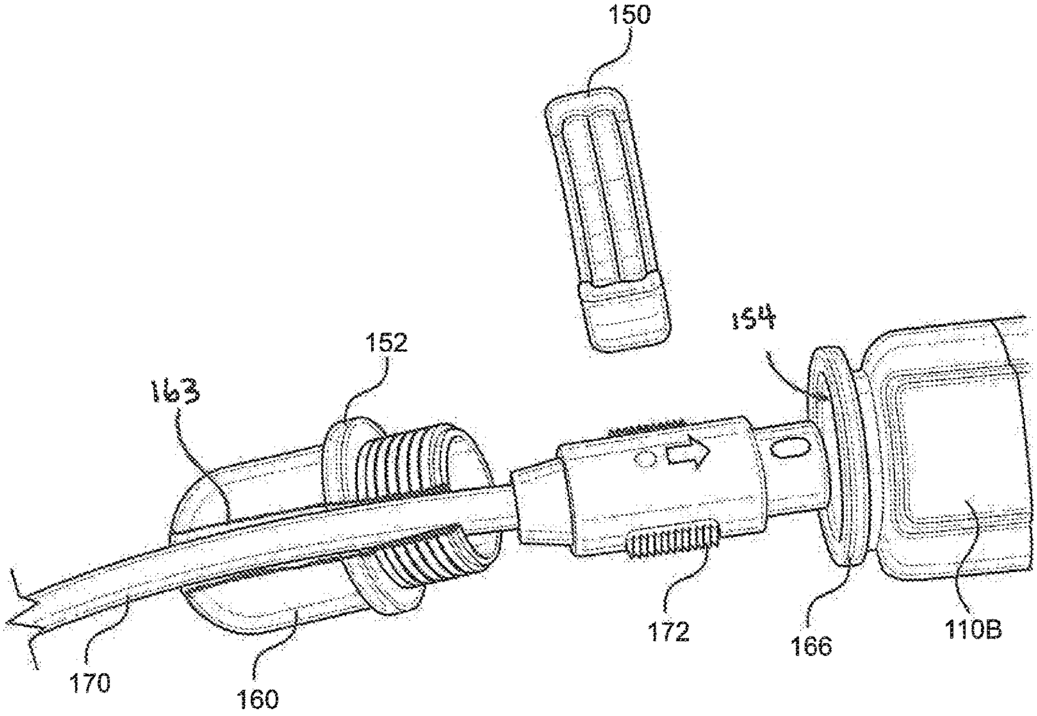
FIG. 8 is a side view of a portion of the Magnetic Connector Assembly of FIG. 6, illustrating the attachment of the locking hood to a data cable connector by threading the hood into the female portion and securing it in place with the locking ring.

As depicted in FIG. 8, a screw locking hood 160 may be used with a data cable 170 having a data cable connector 172. In use, data cable connector 172 will be connected to receiver 154, placing the pins of data cable connector 172 into electrical communication with corresponding pins 116 (or pins 136 when the screw locking hood 160 is used with a male connector 130). Screw locking hood 160 is then placed around cable 170 via a slot, or lengthwise opening extending across the side of the screw lock 160, and then slid over data cable connector 172 and screwed into receiver 154, thus securing data cable connector 172 in its connected state. Ring clip 150 may then be placed around lips 152 and 166 in order to further secure screw locking hood 160, and therefore also data cable connector 172, in place.

Figure 9:
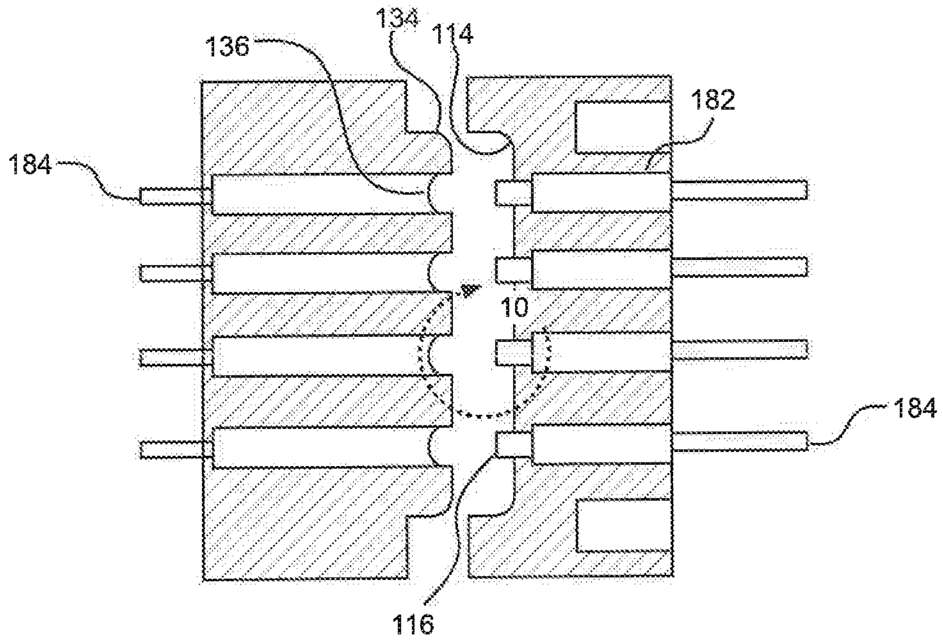
FIG. 9 is a cutaway view of a Magnetic Connector Assembly illustrating the alignment of pins between the male and female connectors.

Referring now to FIG. 9, a female connector 110 and a male connector 130 are shown aligned so that protrusion 134 will fit closely into cavity 114, connecting pins 136 to pins 116. Pins 136 may be slightly indented into the surface 137 of protrusion 134, preventing electrical contact from being made before the male connector 130 and female connector 110 are intentionally and correctly joined. Correspondingly, pins 116 protrude slightly from bottom surface 117 of cavity 114 in order to engage pins 116 when the connectors are joined, but do not extend outside of cavity 114, thus preventing contact from being made before the connectors are joined, as well as preventing damage to pins 116, for example, from lateral forces when the female connector is stepped on or struck against an external object. Pins 116 are supported upon springs 180 (shown in FIG. 11) inside spring chambers 182, allowing them to be pressed inward into female connector 110 by pins 136; when pins 136 push pins 116 inward, a spring force presses pins 116 back against pins 136, ensuring a strong and consistent electrically conductive connection between each pin 116 and its corresponding pin 136.

Figure 10:
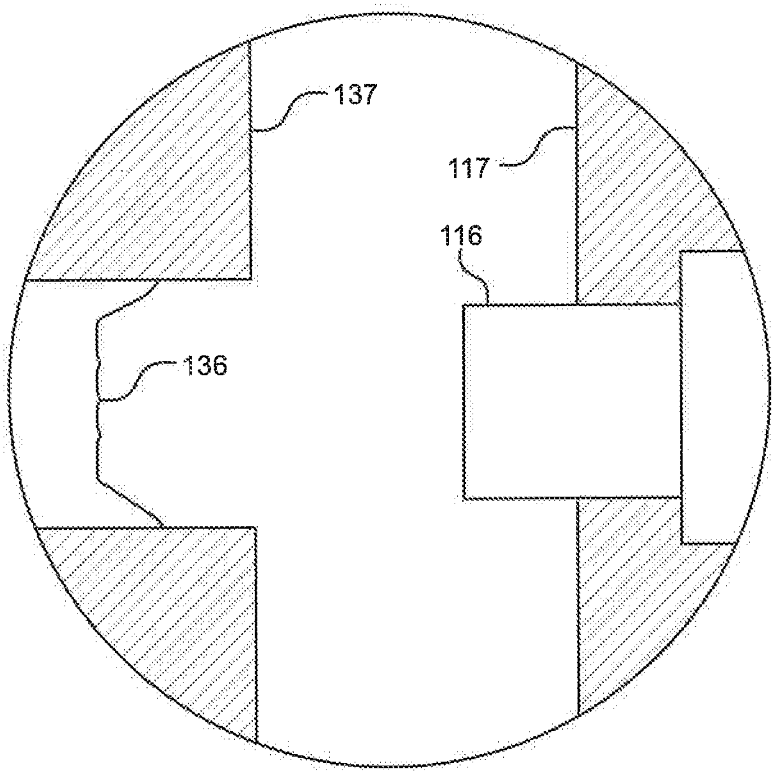
FIG. 10 is an enlarged view of area "10" in FIG. 9 showing the slight protrusion of pins on the female portion and slight recess of pins on the male portion.

Referring now to FIG. 10, a close-up view of area 10 from FIG. 9 is shown, illustrating the position of a pin 136 in male connector 130 and the position of a corresponding pin 116 in the female connector 110. As shown, pin 116 extrudes from bottom surface 117 of cavity 114 at least sufficiently to engage pin 136, which is slightly indented into top surface 137 of protrusion 134.

Figure 11:
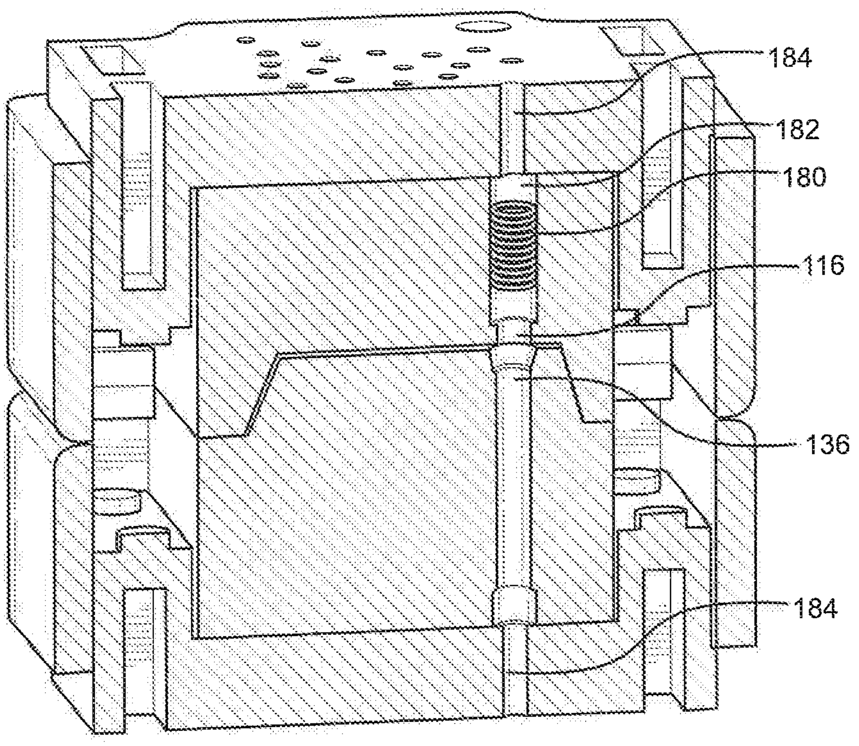
FIG. 11 is an exploded cutaway view of a Magnetic Connector Assembly illustrating the engagement of a contact pin of the female portion of the connector with a contact pin of the male portion of the connector.

Referring now to FIG. 11, a preferred embodiment of the placement and supporting structure of pins 116 and 136 is illustrated. Pins 116 of the female connector 110 are supported on springs 180 in a spring chamber 182. The springs 180 and spring chamber 182 are supported by electrically conductive pegs 184 which also provide electrical communication with an apparatus or cable connected to receiver 154. Likewise, additional pegs 184 support pins 136 in the male connector 130 and provide electrical connection with a cable or other apparatus connected to the male connector 130.

Since pins 116 are supported by springs 180, they can protrude slightly from the surface in cavity 114, and may be pushed down by contact with pins 136, assuring positive contact between the pins and the formation of an electrically conductive connection.

Figure 12:
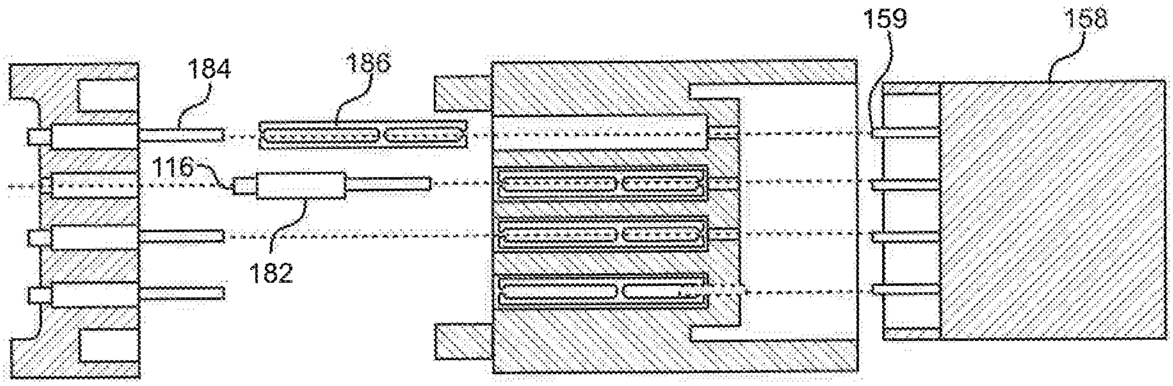
FIG. 12 is a cutaway view of a female portion of a Magnetic Connector Assembly illustrating the supporting structure of the conductive pins that establish an electrical pathway between the pin and the data cable when connected.

Referring now to FIG. 12, the supporting structure of contact pins 116 as used in various embodiments of the female connector 110 of a Magnetic Connector Assembly of the present invention is illustrated. The supporting structure shown in FIG. 12 is particularly useful in embodiments, such as that of FIGS. 3-4, in which the female connector 110 includes a receiver 154 for attachment to a traditional connector.

The pegs 184 of pins 116 are received by H-shaped conductive contacts 186 situated in the base 110B of the female connector 110. Contacts 186 also receive pins 1159 of connector 158, providing an electrically conductive connection between pins 116 and pins 159. Preferred embodiments of male connector 130 configured for receiving external connectors would similarly have H-shaped conductive contacts 186 as part of the supporting structure for pins 136.

Figure 13:
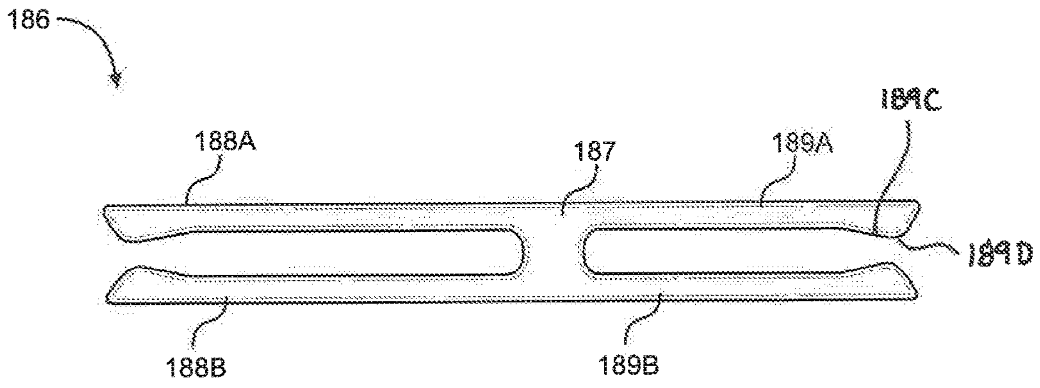
FIG. 13 is a side view of an H-shaped conductive contact providing an electrically conductive connection between the pins of the female portion of a Magnetic Connector Assembly and the pins of an external connector.

As seen in FIG. 13, the H-shaped contacts 186 include a base 187 from which a first pair of substantially parallel arms 188A and 188B extend in a first direction, and a second pair of substantially parallel arms 189A and 189B extend in an opposite direction. Each arm terminates in a ridge 189C that tapers to a point 189D on its end. Arms 188A and 188B have a limited flexibility sufficient to allow them to receive a peg 184 while maintaining electrically conductive contact with the peg 184. Likewise, arms 189A and 189B have a similar flexibility in order to receive and maintain electrically conductive contact with pins 159.

FIGS. 14-20 illustrate exemplary embodiments of the Magnetic Connector Assembly having various combinations of data cables, peripheral devices, and locking hoods. It will be apparent to one having ordinary skill in the art that other combinations of the features described herein are possible, and such combinations are fully contemplated herein. For example, where a data cable is illustrated at one end, and a peripheral at another, variants with data cables on both ends and variants with peripheral devices on both ends are fully contemplated. Moreover, the various types of connectors and locking hoods can be mixed and matched without departing from the scope of the invention, and data cables soldered to the male connectors 130 or female connectors 110 may alternatively be attached with the connector-receiver mechanisms, locking hoods, or both that are described above. Additionally, where a male connector 130 is depicted or described as being attached to a particular object, and a female connector 110 to a second object, it is fully contemplated that the male and female connectors may be swapped out in corresponding embodiment, so that the female connector 110 is attached to the first object and the male connector 130 is attached to the second object.

Figure 14:
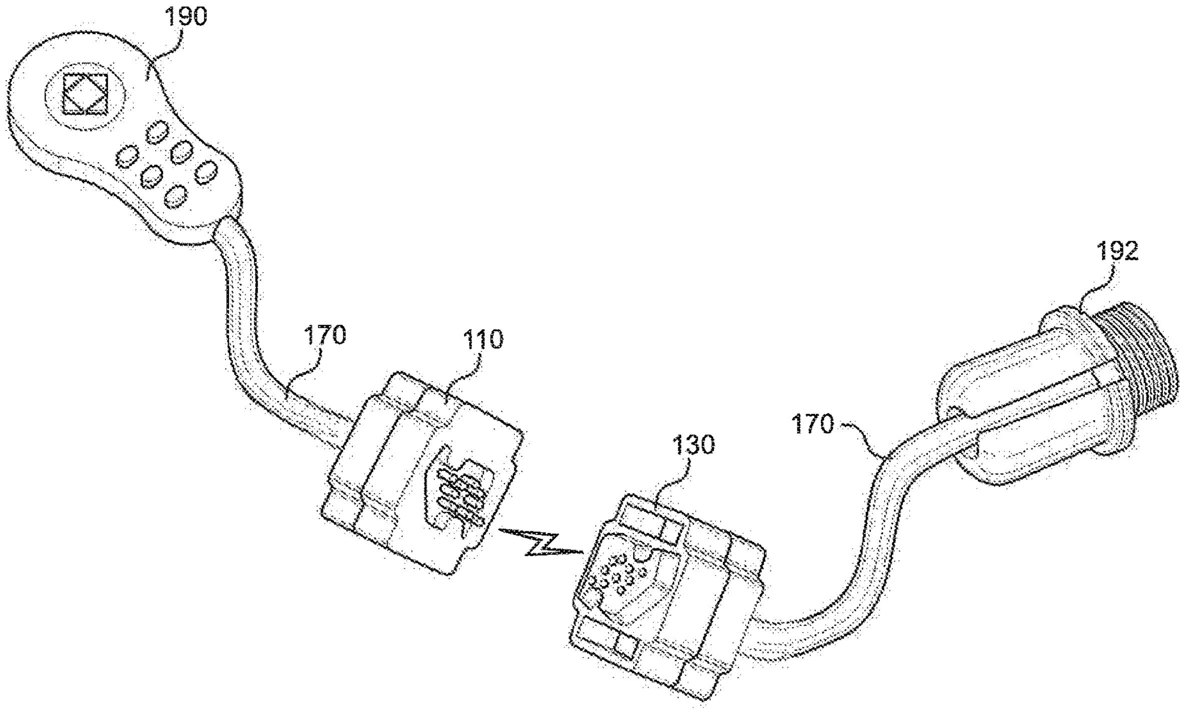
FIG. 14 illustrates a Magnetic Connector Assembly having a remote control at one end and a data cable at the other end, the data cable terminating in a non-magnetic connector that establishes a magnetically biased break-away connection between the remote control and the data cable connector having a threaded locking hood.

Referring to FIG. 14, an exemplary embodiment of a Magnetic Connector Assembly is shown, in which a remote 190 is connected via a data cable 170 to a female connector 110. The corresponding male connector 130 is connected to a second data cable 170 terminating in a connector 192 for an external device. In a preferred embodiment, remote 190 is a hospital remote with nurse call and TV control features. The wires of data cable 170 of remote 190 are soldered directly to pins 116 or pegs 184 or the female connector 110 in a preferred embodiment, but in alternative preferred embodiments the data cable 170 is connected to the female connector 110 through the various other connection structures previously described. Likewise, the wires of the other data cable 170 are soldered directly to pins 116 or pegs 184 of the male connector 130, but in alternate preferred embodiments, the cable 170 is connected to the male connector 110 through the various other connection structures described above.

As shown in FIG. 14, Magnetic Connector Assembly 100 is shown midspan of an electrical cable 170. It is to be appreciated that the present invention contemplates electrical cables that are prefabricated with the Magnetic Connector Assembly 100 already present in cable 170. However, it is also fully contemplated herein that a standard cable 170 may be retrofitted with the Magnetic Connector Assembly 100 of the present invention to provide a magnetically biased break-away electrical connection for cable 170.

Figure 15:
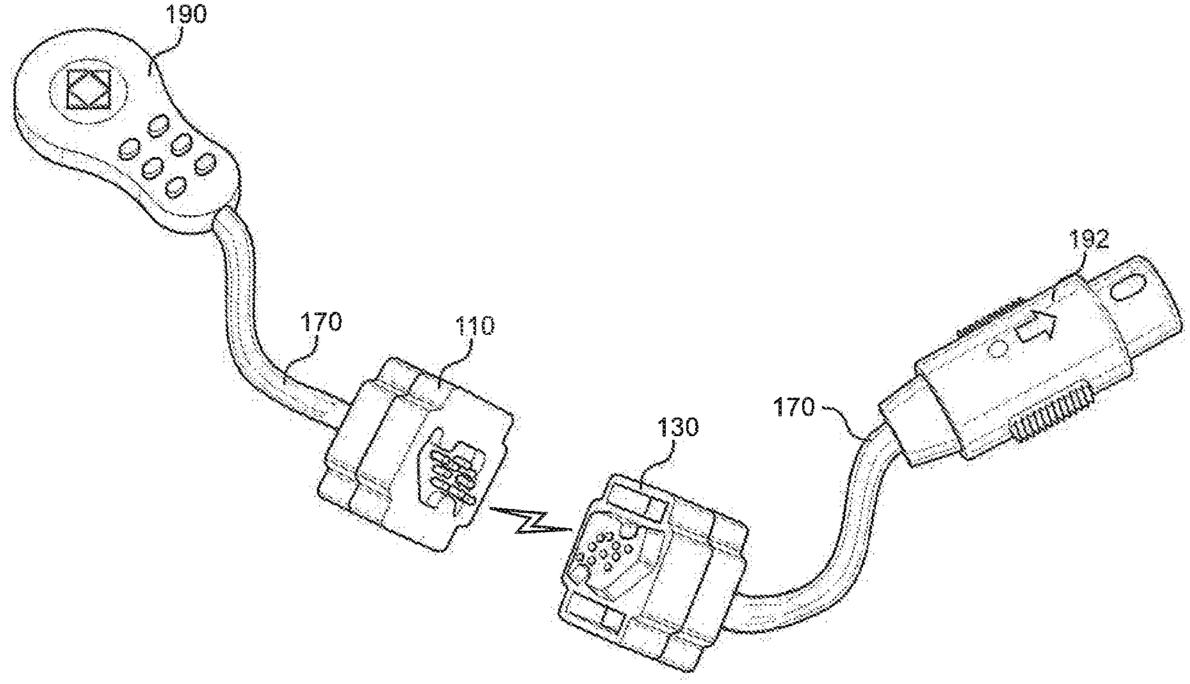
FIG. 15 illustrates a Magnetic Connector Assembly having a remote control at one end and a data cable at the other end, the data cable terminating in an alternate non-magnetic connector.

Referring now to FIG. 15, another exemplary embodiment of a Magnetic Connector Assembly is illustrated. As with the previously illustrated embodiment, the Magnetic Connector Assembly has a remote 190 connected via a data cable 170 to a female connector 110, and another data cable 170 connected to a male connector 130. As illustrated in FIG. 15, the connector 192 at the opposite end of the data cable 170 connected to the male connector 130 is not limited to a particular type of connector. Connector 192 may be an 8-pin or 9-pin connector known in the art, another type of connector known in the art, or a custom-made connector for a particular application.

Figure 16:
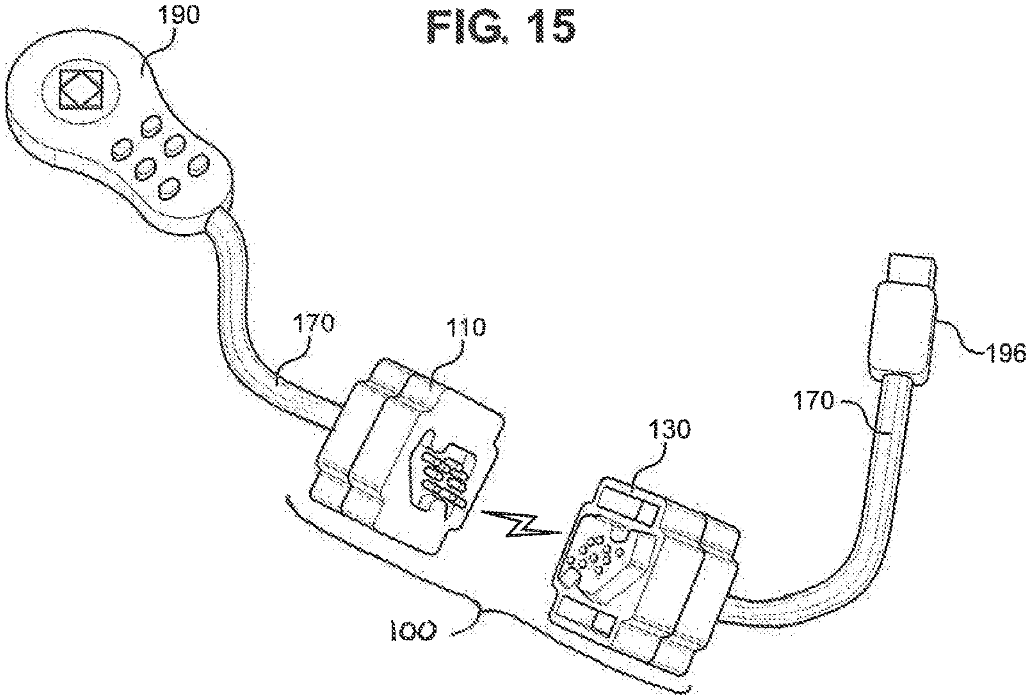
FIG. 16 illustrates a Magnetic Connector Assembly having a remote control at one end and at the other end a cable terminating in a modular connector.

Referring now to FIG. 16, a Magnetic Connector Assembly is illustrated with a remote 190 connected via a data cable 170 to the female connector 120, and a data cable 170 attached to a male connector 130 and terminating in an 8-pin 8P8C connector 196. In an alternative embodiment, connector 196 is a 10-pin 10P10C connector.

Figure 17:
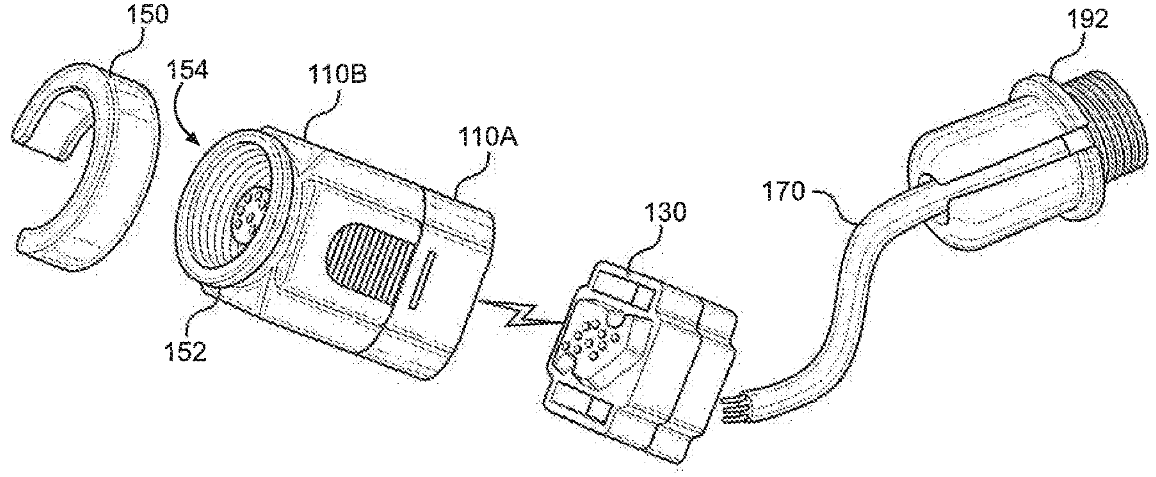
FIG. 17 illustrates a Magnetic Connector Assembly having a clip lock and a receiver for a connector at one end, and at the other end a data cable terminating in a non-magnetic connector and depicting the ability to cut an existing cable to insert the Magnetic Connector Assembly to create a break-away connection.

Referring now to FIG. 17, a Magnetic Connector Assembly is illustrated having a data cable 170 connected to the male connector 130, and a receiver 154 for an external cable on the base 110B of the female connector 110. When an external cable is attached to the female connector 110, a ring clip 150 secures them together. The bare wires of cable 170 depicted in this figure illustrate the application of the Magnetic Connector Assembly to an existing cable 170 by cutting the cable mid-span, and retrofitting the cable 170 with the connector of the present invention.

Figure 18:
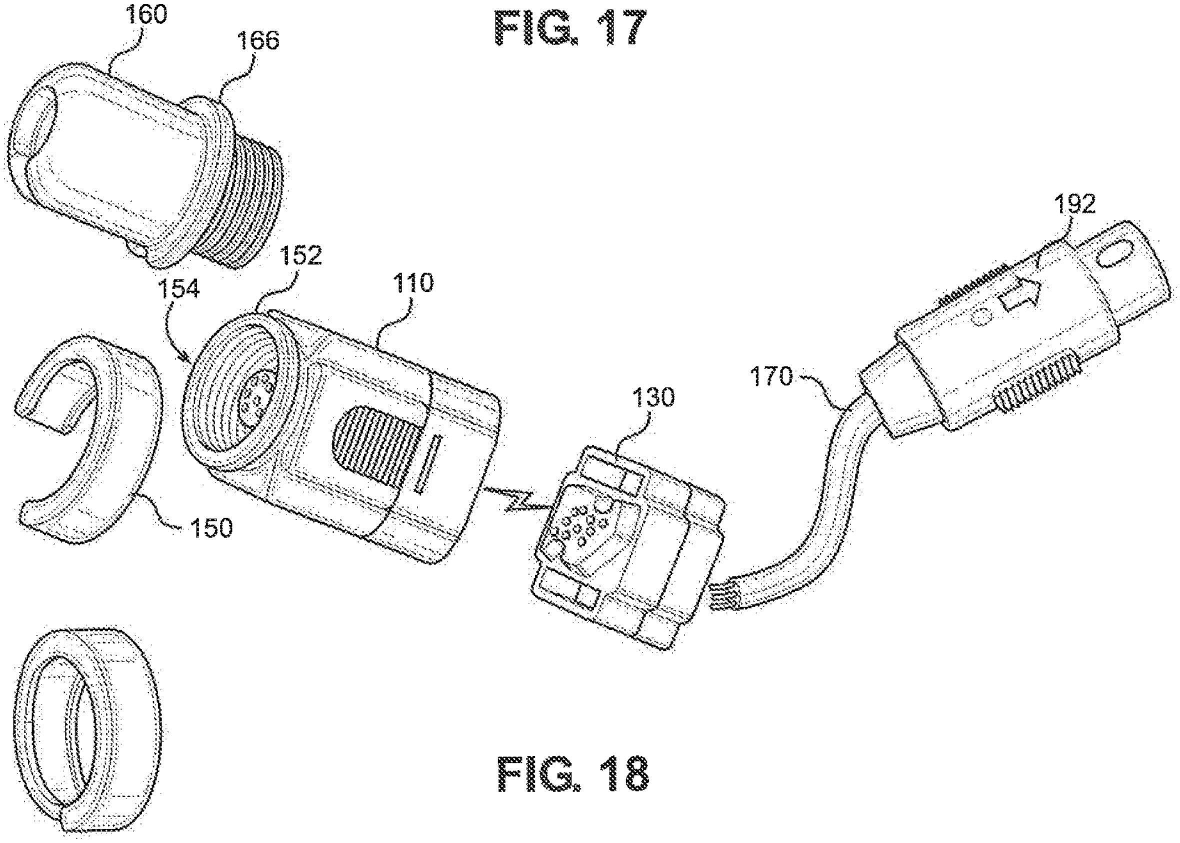
FIG. 18 illustrates a Magnetic Connector Assembly having a threaded locking hood and a receiver for a connector at one end, and at the other end a data cable terminating in a non-magnetic connector and depicting the ability to cut an existing cable to insert the Magnetic Connector Assembly to create a break-away connection.

Referring now to FIG. 18, a Magnetic Connector Assembly is illustrated having a data cable 170 connected to the male connector 130, and a receiver 154 for an external cable on the base 110B of the female connector 110. Receiver 154 has threads 162 (as shown in FIG. 7) by which it receives the threaded end of screw lock 160 to hold a connector from a data cable in place. In a preferred embodiment, receiver 154 and screw lock 160 have lips 152 and 166 which are secured by ring clip 150 when screw lock 160 is engaged with receiver 154. The bare wires of cable 170 depicted in this figure illustrate the application of the Magnetic Connector Assembly to an existing cable 170 by cutting the cable mid-span, and retrofitting the cable 170 with the connector of the present invention.

Figure 19:
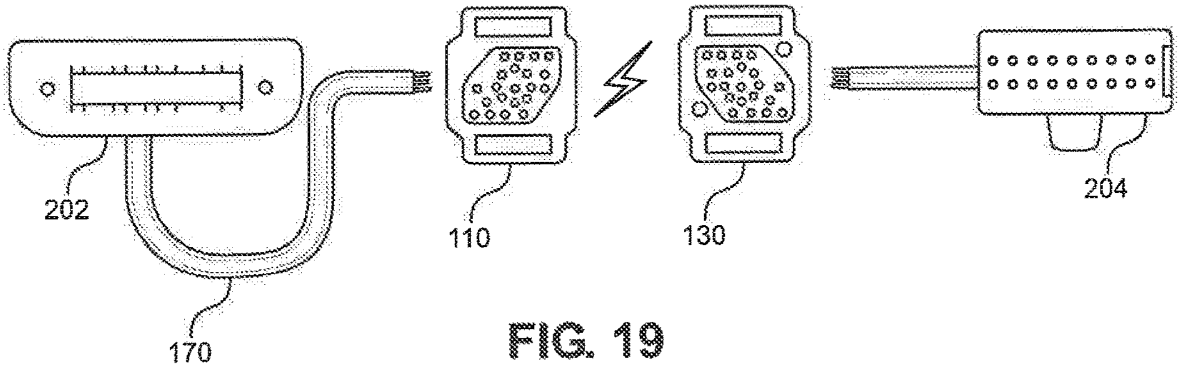
FIG. 19 illustrates a Magnetic Connector Assembly having at one end a data cable terminating in a 26-pin connector and at the other end a data cable terminating in an 18-pin connector and depicting the ability to cut an existing cable to insert the Magnetic Connector Assembly to create a break-away connection.

Referring now to FIG. 19, a preferred embodiment of a Magnetic Connector Assembly having twenty (20) pins on each of the male connector 130 and female connector 110 is illustrated. Attached to the female connector 110 is a data cable 170 terminating in a 26-pin connector 202. In a preferred embodiment, the wires of data cable 170 are soldered directly to the pins 116 or pegs 184 of the female connector 110. In alternate embodiments, data cable 170 is connected to female connector 110 in the various forms described above. The bare wires of cable 170 depicted in this figure illustrate the application of the Magnetic Connector Assembly to an existing cable 170 by cutting the cable mid-span, and retrofitting the cable 170 with the connector of the present invention.

Attached to the male connector 130 is a data cable 170 terminating in an 18-pin connector 204. In a preferred embodiment, the wires of data cable 170 are soldered directly to the pins 136 or pegs 184 of the male connector 130. In alternate embodiments, data cable 170 is connected to male connector 130 in the various forms described above.

Figure 20:
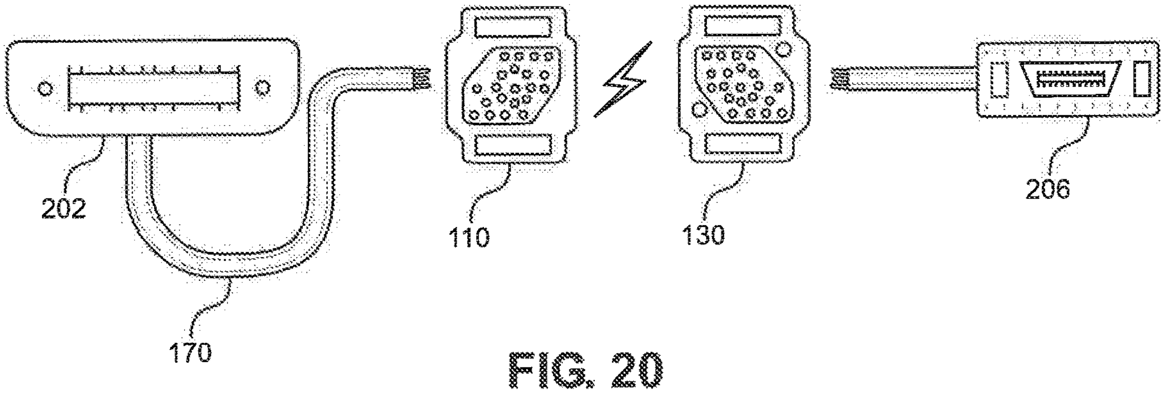
FIG. 20 illustrates a Magnetic Connector Assembly having at one end a data cable terminating in a 26-pin connector and at the other end a data cable terminating in a 20-pin D-sub connector and depicting the ability to cut an existing cable to insert the Magnetic Connector Assembly to create a break-away connection.

Referring now to FIG. 20, a preferred embodiment of a Magnetic Connector Assembly having seventeen (17) pins on each of the male connector 130 and female connector 110 is illustrated. Attached to the female connector 110 is a data cable 170 terminating in a 26-pin connector 202. In a preferred embodiment, the wires of data cable 170 are soldered directly to the pins 116 or pegs 184 of the female connector 110. In alternate embodiments, data cable 170 is connected to female connector 110 in the various forms described above.

Attached to the male connector 130 is a data cable 170 terminating in a 20-pin D-sub connector 206. in a preferred embodiment, the wires of data cable 170 are soldered directly to the pins 136 or pegs 184 of the male connector 130. In alternate embodiments, data cable 170 is connected to male connector 130 in the various forms described above.

Referring briefly to FIGS. 1 and 2, the general shape of cavity 114 and corresponding protrusion 134 are shown to be complementary reversible geometries, with magnetic elements 118, 120, 138 and 140 cooperating to ensure the proper rotation, and thus the proper electrical connection. Also, referring briefly to FIGS. 19 and 20, the general shape of the cavity and protrusion are not complementary reversible geometries. It is to be appreciated from this disclosure that the present invention is not limited to any geometric shape for the cooperating cavity 114 and protrusion 134. Further, it is shown in FIGS. 1 and 2 that the magnetic elements 118, 120, 138 and 140 are shown to be rectangular, and on opposite sides of female portion 110 and male portion 130. Other locations and configurations of the magnetic elements are fully contemplated herein. Multiple magnetic elements may be used around the periphery of bodies 110 and 130 to provide the magnetically biased break-away electrical connections of the present invention.

While there have been shown what are presently considered to be preferred embodiments of the present invention, it will be apparent to those skilled in the art that various changes and modifications can be made herein without departing from the scope and spirit of the invention.

I claim:

1. A magnetic connector assembly comprising:

a female connector having a body with a cavity, the cavity having a rotationally symmetrical but otherwise irregular shape, a plurality of conductive contact pins protruding from a bottom surface of the cavity, and magnets situated outside of and on opposite ends of the cavity;

a male connector having a body with a protrusion corresponding in shape to the cavity of the female connector, the protrusion being sized to be received by the cavity, a plurality of conductive contact pins indented into a top surface of the protrusion, and magnets situated outside of and on opposite ends of the protrusion;

wherein the female connector and the male connector are magnetically repulsed from each other when attempted to be connected in an incorrect orientation, and are drawn together and secured by magnetic force when connected in a correct orientation;

wherein the conductive contact pins of the female connector engage the conductive contact pins of the male connector to establish electrical communication across the connector assembly; and wherein the conductive contact pins of the female connector are spring-loaded.

2. The magnetic connector assembly of claim 1, wherein the cavity and the protrusion have a length-to-width ratio between 0.5 and 1.5.

3. The magnetic connector assembly of claim 1, further comprising a screw locking hood.

4. The magnetic connector assembly of claim 3, wherein the screw locking hood further comprises a slotted receptacle.

5. The magnetic connector assembly of claim 3, wherein the screw locking hood has a threaded portion for engagement with the receiver.

6. The magnetic connector assembly of claim 1, further comprising a receiver for a data cable connector.

7. The magnetic connector assembly of claim 6, further comprising a ring clip for securing the data cable connector.

8. The magnetic connector assembly of claim 6, wherein the female connector further comprises a receiver for a data cable connector on a base of the female connector, and the male connector further comprises a screw locking hood for securing a data cable connector to the male connector, the screw locking hood having a threaded portion for engagement with the receiver, and a lip for engagement with a lip on the female connector.

9. The magnetic connector assembly of claim 6, wherein the female connector and the male connector are magnetically biased to secure the data cable connector in place.

10. The magnetic connector assembly of claim 6, wherein the female connector and the male connector are further configured to establish electrical communication between the data cable connector and an external device.

11. The magnetic connector assembly of claim 6, wherein the female connector and the male connector are further configured to establish electrical communication between the data cable connector and a remote control device.

* * * * *